United States Patent [19]

Vanderhoff et al.

[11] Patent Number: 5,106,903

[45] Date of Patent: Apr. 21, 1992

[54] PREPARATION OF LARGE PARTICLE SIZE MONODISPERSE LATEXES

[75] Inventors: John W. Vanderhoff; Fortunato J. Micale; Mohamed S. El-Aasser; Chi-Ming Tseng, all of Bethlehem, Pa.

[73] Assignee: Lehigh University, Bethlehem, Pa.

[21] Appl. No.: 234,302

[22] Filed: Aug. 19, 1988

Related U.S. Application Data

[62] Division of Ser. No. 682,181, Dec. 17, 1984, Pat. No. 4,791,162.

[51] Int. Cl.$^5$ .............................................. C08F 2/16
[52] U.S. Cl. .................................. 524/458; 524/157; 524/166; 524/460; 526/201; 526/203
[58] Field of Search ............... 524/166, 157, 458, 460; 526/201, 203

[56] References Cited

U.S. PATENT DOCUMENTS

| | | | |
|---|---|---|---|
| 3,424,706 | 1/1969 | Smith et al. | 524/458 |
| 3,594,336 | 7/1971 | Bergmeister et al. | 524/458 |
| 4,046,730 | 9/1977 | Tortai | 524/458 |
| 4,247,434 | 1/1981 | Vanderhoff et al. | 526/201 |
| 4,459,378 | 7/1984 | Ugelstad | 524/458 |

FOREIGN PATENT DOCUMENTS

| | | | |
|---|---|---|---|
| 0920867 | 3/1963 | United Kingdom | 524/548 |
| 1339182 | 11/1973 | United Kingdom | 524/458 |

*Primary Examiner*—Joseph L. Schofer
*Assistant Examiner*—J. M. Reddick
*Attorney, Agent, or Firm*—Ratner & Prestia

[57] ABSTRACT

Monodisperse latexes of at least 2–30 microns particle size are prepared from an emulsion recipe comprising a monodisperse seed latex polymer on the order of 2 microns or less particle size, a polymerizable monomer, an initiator, at least one inhibitor, and a water-soluble polymeric emulsifier of $10^4$–$10^7$ molecular weight. Optional ingredients are crosslinking monomer, oil-soluble inhibitor if the mixture is to be stored before polymerization, and one or more additional emulsifiers selected from a water-soluble comonomer or polymer of $0.3 \times 10^3$–$5 \times 10^3$ molecular weight and a non-polymeric anionic emulsifier. Additional particle size growth and monodisperse latex yield are realized by polymerization in a microgravity environment.

2 Claims, No Drawings

PREPARATION OF LARGE PARTICLE SIZE MONODISPERSE LATEXES

ORIGIN OF THE INVENTION

The invention described herein was made in the performance of work under a contract with the National Aeronautics and Space Administration.

This application is a division of application Ser. No. 682,181, filed Dec. 17, 1984, now U.S. Pat. No. 4,791,162.

BACKGROUND OF THE INVENTION

This invention relates to the preparation of large particle size monodisperse latexes by seeded emulsion polymerization.

Considerable effort has been expended in recent years to develop large particle size monodisperse latexes as standards for instrument calibration and for other uses. By "monodisperse" particles is meant latex particles having coefficients of variation (standard deviation divided by number average diameter) of less than 2 percent. By large particle size is meant a particle size (number average diameter) of at least 2-30 microns or more, e.g., up to about 100 microns or more. Prior to the microgravity emulsion polymerization described in U.S. Pat. No. 4,247,434 to Vanderhoff et al, four approaches have been taken in attempts to prepare such latexes.

The pioneer approach was a successive seeded emulsion polymerization method developed by Vanderhoff et al., *J. Opt. Soc. Am.*, 1954, 44, 603. In this process, a small monodisperse latex was used as the seed. To this latex was added monomer, a peroxy initiator, and an anionic emulsifier. The reaction mixture was then heated to the polymerization temperature, and by carefully controlling emulsifier concentration, nucleation of new particles was avoided. Each monodisperse latex thus produced was used as the seed for the next polymerization. It was found that the tolerable range of emulsifier concentration was broad at small particles sizes but became narrower with increasing particle size. The method produced monodisperse particles of particle size 0.1-2.0 microns with coefficients of variation of 5% at 0.1 micron, 1% at 0.2 micron, 0.5% at 1 micron and 0.75% at 2 microns. However, the amount of coagulum increased with increasing particle size above 2 microns, so that only 100 gram quantities of particle sizes of 5.6 microns were produced.

In the second technique the emulsion polymerization was carried out without added emulsifier, as reported by Matsumoto et al, *Kobunshi-Kagaku*, 1965, 22, 481. Apparently, the persulfate ion initiator introduced sulfate end groups into the polymer molecules which then acted as emulsifier to stabilize the particles. Particle size of the latexes was determined by the concentrations of monomer, initiator and electrolyte. This method produced monodisperse latexes of 0.1-1 micron particle size and has been claimed to produce particle sizes of up to 4 microns. Y. Chung-Li et al, *Prog. Colloid Polym. Sci.*, 1976, 60, 163.

In the third technique, a microsuspension polymerization was used, similar to conventional suspension polymerization except for a higher concentration of stabilizer which gave a relatively broad distribution of smaller particle sizes, e.g., average size 1-100 microns. Illustrative of this method is the "limited coalescence" method of R. M. Wiley (U.S. Pat. No. 2,932,629) which uses as the suspension stabilizer lyophobic colloidal particles modified with a "promoter" to adjust the hydrophilic-hydrophobic balance so that they adsorb at the oil-water interface. This method has been used to prepare styrene-divinylbenzene copolymer particles of 5-100 micron average diameter with coefficients of variation of about 20%. However, these particles are not monodisperse and even if the samples are fractionated to give narrower-size fractions, the particle size distributions are still much broader than those of latexes prepared by seeded emulsion polymerization.

The fourth technique is a seeded emulsion polymerization using a two-step high-swelling ratio approach as described by J. Ugelstad et al, *Adv. Colloid Interface Sci.*, 1980, 13, 101. The combination of a water insoluble compound and a water-miscible organic solvent as swelling agents gave high monomerpolymer swelling ratios, thereby allowing the preparation of large particle size latexes with fewer seeding steps. Latexes prepared by this method are said to have particle sizes up to 50 microns. However, the latexes comprise a main distribution of monodisperse particles with contaminating smaller and larger off-size particles, and it has been reported that these particles explode and rupture upon exposure to the electron beam in an electron microscope, possibly because of sudden vaporization of water-insoluble compounds remaining in the particles.

In summary, each of the foregoing methods is defective in one or more respects. Although the first method (successive seeded emulsion polymerization) provides monodisperse latexes in high concentrations, the particle size is limited to about 2 microns and even at these sizes, either a new crop of small particles is nucleated or excessive coagulum is formed. The second method (emulsifier-free emulsion polymerization) produces monodisperse latexes only in low concentrations (10% or less) and particle sizes smaller than 1 micron. Even when the technique is combined with seeding, the maximum size particles that can be produced is only 4 microns. The third technique (microsuspension) produces a broad distribution of particle sizes and requires tedious and time-consuming fractionation to give narrow particle size distribution. Even then, the particle size distributions of the fractionated latexes are broader than those of the monodisperse latexes prepared by seeded emulsion polymerization. The fourth technique (high-swelling seeded emulsion polymerization) gives latexes of poor uniformity, and their use as size standards is limited by their tendency to explode upon heating or exposure to an electron beam. Moreover, this method requires separation of the crop of new small particles as well as the off-size larger particles to give a latex of narrow particle size distribution.

U.S. Pat. No. 4,247,434 discloses further improvements upon the successive seeded emulsion polymerization technique by practice of the process in a microgravity environment such as has been made available by NASA space shuttle missions. The microgravity environment avoids gravity-related problems such as settling and creaming due to density differences during polymerization, and thereby promotes the production of monodisperse particles larger than 2 microns. Despite the promise of the microgravity process, problems still persist in efforts to prepare monodisperse latexes having the larger particle sizes. These include a trade-off between larger particle size and concentration thereof (the concentration of larger particles decreases as particle size increases, due to formation of a new crop of small particles and/or excessive coagulum), over-size particle formation from particle coalescence, and continuing tendencies toward creaming and settling.

SUMMARY

In response to these problems, an extensive investigation was made into the formulation of the polymerizable mixtures, particularly with respect to the emulsifier component and the combination thereof with polymerization initiator and inhibitor. It has now been found, as a result of the investigations, that monodisperse latexes having an average particle size of at least 2-30 microns can be produced by formulating a monodisperse seed latex polymer of particle size on the order of 2 microns or less with polymerizable monomer, an initiator, at least one inhibitor, and an emulsifier component (which also acts as a colloidal stabilizer to stabilize the latex particles) comprising a first water-soluble polymeric emulsifier of molecular weight of about $10^4$–$10^7$, and optionally at least one of a second water-soluble polymeric emulsifier of molecular weight of about $0.5 \times 10^3$ to $5 \times 10^3$ (or alternatively, a comonomeric emulsifier) and a non-polymeric anionic emulsifier. This formulation will produce the large particle size monodisperse latexes in both gravity and microgravity environments, with additional improvements in the latter environment.

By appropriate choice of emulsifiers and other components of the polymerization mixture within the scope of the invention, and by practice of the successive seeded emulsion polymerization technique, particularly in a microgravity environment, it is believed that monodisperse latexes of particle sizes up to 100 microns or more may be prepared, having high polymer solids (up to about 50%) and low coagulum content with concomitant high product yield. Further more, the invention produces monodisperse latexes without generating a substantial number of smaller or larger off-size particles. The products can thus be used directly for calibration applications without tedious separation for removal of undesired off-size particles.

DETAILED DESCRIPTION

Generally, with the exceptions hereinafter noted, the emulsion polymerization recipes and conditions described in U.S. Pat. No. 4,247,434 are applicable to this invention; accordingly, the disclosure of the patent is incorporated herein by reference.

To practice the method of the invention, a polymerizable mixture is first prepared according to the following recipe:

(A) about 2-30 parts by weight of a monodisperse seed latex polymer of particle size on the order of 2 microns;

(B) about 10-50 parts by weight of a polymerizable, monofunctional (non-crosslinking) monomer;

(C) 0 to about 0.1 parts by weight of a di-, tri-, or polyfunctional (crosslinking) monomer;

(D) about 0.01-0.2 parts by weight of an initiator;

(E) about 0.001 to 0.1 parts by weight of at least one inhibitor;

(F) an emulsifier component comprising:

(i) about 0.05-2.0 parts by weight of a first water-soluble polymeric emulsifier of molecular weight of about $10^4$–$10^7$;

(ii) 0 to about 0.05 parts by weight of a second water-soluble polymeric emulsifier of molecular weight of about $0.5 \times 10^3$ to $5 \times 10^3$ (or alternatively a comonomeric emulsifier); and (iii) 0 to about 0.01 parts by weight of a non-polymeric anionic emulsifier; and (G) the balance being water, to make 100 parts by weight of total mixture.

The monodisperse seed latex polymer (A) is any polymer of one or more ethylenically unsaturated monomers susceptible of emulsion polymerization. The following are monomers of this type: vinyl aromatics such as styrene, vinyl toluene, styrene derivatives (monochlorostyrene, dichlorostyrene, bromostyrene, dimethyl styrene, t-butylstyrene), or vinyl acetate, vinyl stearate, vinyl chloride, butadiene, isoprene; ethylenically unsaturated acids, esters and amides such as acrylic acid, methacrylic acid, alkyl acrylates, alkyl methacrylates, acrylamide, methacrylamide, and substituted variations thereof, such as hydroxy-alkyl acrylates and methacrylates, N-methylolacrylamide and N-methylolmathacryamide; sulfonates such as vinyl sulfonate and vinyl benzyl sulfonate; and other monomers such as are described in U.S. Pat. No. 4,247,434.

The same monomer(s) used to form the seed polymer (A), or other ethylenically unsaturated polymerizable monomer, may be used as the non-crosslinking monomer (B). Mixtures of different monomers may be used as monomer component (B).

A crosslinking monomer may optionally be used to help reduce or eliminate any tendency of the monomer to coalesce with the polymer seed latex particles or polymer product particles upon formation. The crosslinking monomer is any poly-ethylenically unsaturated monomer effective for crosslinking of the emulsion polymer formed from monomer components (B) in the presence of the seed latex polymer (A). Typical crosslinking monomers are the esters of α, B-monoethylenically unsaturated acids and polyhydric alcohols such as alkylene glycol diacrylates and dimethacrylates including ethylene glycol diacrylate, 1,3-butylene glycol diacrylate, 1,4-butylene glycol diacrylate, propylene glycol diacrylate, triethylene glycol dimethacrylate, 1,3-glycerol dimethacrylate, 1,1,1-trimethylol propane dimethacrylate, 1,1,1-trimethylol ethane diacrylate, trimethylolpropane triacrylate, pentaerythritol trimethacrylate, 1,2,6-hexane triacrylate, sorbitol pentamethacrylate, and the like. Other useful crosslinkers include acrylamides such as methylene bisacrylamide and methylene bismethacrylamide; vinyl compounds such as vinyl methacrylate, vinyl crotonate, vinyl acrylate, vinyl acetylene, divinyl benzene, trivinyl benzene, divinyl acetylene, divinyl ethane, divinyl sulfide, divinyl ether, divinyl sulfone, hexatriene, ethylene glycol divinyl ether, divinyl dimethyl silane, glycerol trivinyl ether, and divinyl adipate; and allyl compounds such as allyl methacrylate, allyl acrylate, diallyl cyanamide, triallyl cyanurate, diallyl phthalate, diallyl maleate, diallyl fumarate and diallyl itaconate. Preferably, crosslinking monomer concentration should not exceed 0.06% of the polymerizable mixture since it has been observed in some polymerizations that concentrations over 0.06% result in undesirable pear-shaped doublet particles. The crosslinking monomer component may be a single monomer or a mixture of different crosslinking monomers may be used.

Suitable free radical initiators (D) include 2,2'-azobis-(2-methylbutyronitrile) and 2,2'-azobis(isobutyronitrile) or mixtures of two or more thereof. Peroxy initiators may also be used, such as benzoyl peroxide, t-butylhydroperoxide or sodium persulfate, preferably in admixture with the azo initiators.

Suitable free radical inhibitors (E) include hydroquinone, benzoquinone, catechol, tertiary butyl pyrocatechol, pyrogallol, thiourea and dimethyl dithiocarbamate or mixtures of two or more thereof.

The initiators should be soluble in the monomer (oil) phase but not totally insoluble in the aqueous phase. Hence, their solubilities may be characterized as oil-soluble, sparingly water-soluble. In contrast, the inhibitors preferably are water-soluble although some oil-solubility combined with slight water-solubility is also tolerable, depending on the monomer to be polymerized, the seed polymer and other ingredients of the mixture.

The primary emulsifier (i) of emulsifier components (F) is a water-soluble polymeric emulsifier of molecular weight of about $10^4$ to $10^7$, such as a polyvinylpyrrolidone, vinylpyrrolidone-sodium vinylsulfonate copolymers, vinylpyrrolidone-isodecylmethacrylate-sodium vinylsulfonate terpolymer, polyacrylamide, hydroxyethylcellulose, and the like, including mixtures thereof.

The preferred polymeric emulsifiers are those formed from 95.0–99.8% hydrophilic backbone monomer, 0–2.0% hydrophobic monomer and 0.2–3.0% ionic monomer of which the following are representative: 99.0:1.0 vinyl-pyrrolidone-sodium vinylsulfonate and 98.8:0.2:1.0 vinylpyrrolidone-isodecyl methacrylate-sodium vinylsulfonate. Other hydrophobic monomers useful in place of or in addition to isodecylmethacrylate in the foregoing copolymers include acrylates or methacrylates of $C_6$–$C_{20}$ monohydroxy alcohols, such as lauryl methacrylate, octyl acrylate and 2-ethylhexyl acrylate, and vinyl aromatic monomers such as styrene and vinyltoluene. It has been determined that the water-soluble copolymeric emulsifiers give better particle uniformity and higher product yield than homopolymers of a hydrophilic monomer when used as sole emulsifier, probably due to superior efficacy as colloidal stabilizers of the particles when formed.

Optional water-soluble comonomeric or polymeric emulsifiers (ii) of about $0.3 \times 10^3$–$5 \times 10^3$ molecular weight include carboxyl-containing oligomers such as "Polywet KX-3" sold by Uniroyal, sodium short chain polyvinyl sulfonates, sodium styrenesulfonate, and sodium vinyltoluenesulfonate and mixtures thereof.

Optional non-polymeric anionic emulsifier (iii) includes sodium dodecylsulfate, dihexyl ester of sulfosuccinic acid sodium salt, di-2-ethylhexyl ester of sulfosuccinic acid sodium salt, and the like, including mixtures thereof.

The balance of the polymerizable composition is water, preferably de-ionized water.

In the first stage of preparing the monodisperse latexes of the invention and taking the polymerization of styrene with polystyrene seed polymer as representative, the foregoing formulation is mixed and agitated mildly for about 8–24 hours at a temperature below the decomposition temperature of the initiator, in order to swell the seed latex polymer particles. In the second stage, the mixture is then polymerized by heating above the decomposition temperature of the initiator, e.g., at about 60° C. to about 90° C., for about 10–30 hours under continued mild agitation. Other temperatures and polymerization times may be used, depending on the monomer and seed polymer, emulsifier system, initiator and other conditions known to those skilled in the art.

The inhibitor (E) is required to inhibit the formation of radicals in the water phase. An inhibitor which is soluble in an oil phase is required if the polymerization mixture is to be allowed to stand or to be stored for more that a few hours before polymerization is desired. Of course, if the mixture is to be polymerized shortly after formation, an oil-soluble inhibitor will not be required.

Polymerization under microgravity conditions is carried out as described in U.S. Pat. No. 4,247,434 with suitable attention to avoidance of gas bubbles and effective heat transfer in the reaction vessel. Reaction vessels and process control means for such purposes are known and are described in U.S. Pat. No. 4,247,434. As indicated, polymerization in a microgravity environment provides improved particle uniformity and absence of coagulum, particularly in the larger particle size range.

Microgravity conditions are especially appropriate for production of particle sizes over 30 microns, by practice of successive seeded polymerizations. In this technique, monodisperse latexes are prepared having increasingly larger particles sizes by utilizing as the monodisperse seed latex polymer in any one generation the polymer product of a preceding emulsion polymerization. By such repetition, with suitable adjustment of the amount of monomer in the formulation polymerized in each series, several generations or increasingly larger monodisperse latex particles can be produced.

The following examples will serve to further illustrate the invention but are not intended to limit the scope thereof. Of these examples, Examples 1–9 illustrate polymerizations at standard gravity (ground) and Examples 10–20 illustrate microgravity polymerizations. In the examples and elsewhere in this specification all parts and percentages are by weight unless otherwise stated.

EXAMPLE 1

To 63.2 g of a monodisperse polystyrene latex which was prepared in an earlier seeded emulsion polymerization and which contained 28.4% polystyrene particles (number-average diameter of 1.2 $\mu$m (micrometer or micron) and standard deviation of 0.02 $\mu$m) and 0.049% Aerosol MA emulsifier (dihexyl ester of sulfosuccinic acid sodium salt; American Cyanamid) in a 12-oz glass bottle was added 2.1 g 1% aqueous Polywet KX-3 carboxyl-containing oligomer solution (Uniroyal), 21 g 1% aqueous Polyvinylpyrrolidone K-30 solution (GAF Corp), and 140 g deionized water. To this latex was added 72.2 g inhibitor-free styrene monomer, 0.02 g Divinylbenzene 55 (Dow Chemical; 55%) active, cross-linking monomer, 0.086 g 2,2'-azobis-(2-methylbutyronitrile) initiator, 0.063 g hydroquinone inhibitor, and 0.011 g benzoquinone inhibitor. The bottle was capped and rotated end-over-end at 40 rpm for 12 hours to allow the monomer to swell the particles. The bottle was then placed in a rotor and rotated side-over-side in a 70° C. water bath for 24 hours. The resulting latex was fluid and milky-white with very little coagulum, and contained 28.9% monodisperse polystyrene particles with a number-average diameter of 2 0 $\mu$m and a standard deviation of 0.03 $\mu$m. A control polymerization which used potassium persulfate initiator instead of 2,2'-azobis-(2-methyl butyronitrile) gave a latex which contained a new crop of small particles in addition to the monodisperse main distribution.

EXAMPLE 2

To 51.9 g of the monodisperse latex prepared in Example 1 in a 12-oz glass bottle was added 3.15 g 1% aqueous Polywet KX-3 solution, 31.5 g 1% aqueous Polyvinylpyrrolidone K-30 solution, and 137 g deionized water. To this latex was added 75.2 g inhibitor-free styrene, 0.02 g divinylbenzene (55% active), 0.086 g 2,2'-axobis-(2-methylbutyronitrile), 0.063 g hydroquinone, and 0.011 g benzoquinone. The particle-swelling and polymerization were carried out as described in Example 1. The monodisperse latex produced contained 28.6% polystyrene particles with a number-average diameter of 3.2 $\mu$m and a standard deviation of 0.05 $\mu$m. A control polymerization without polyvinylpyrrolidone resulted in complete coagulation of the latex during polymerization.

EXAMPLE 3

To 52.4 g of the monodisperse latex prepared in Example 2 in a 12-oz glass bottle was added 0.29 g 5% aqueous Aerosol MA solution, 3.15 g 1% aqueous Polywet KX-3 solution, 31.5 g 1% aqueous Polyvinylpyrrolidone K-30 solution, and 136.5 g deionized water. To this latex was added 75.2 g inhibitor-free styrene, 0.02 g divinylbenzene (55% active), 0.086 g 2,2'-azobis-(2-methylbutyronitrile), 0.063 g hydroquinone, and 0.011 g benzoquinone. The particle-swelling and polymerization were carried out as described in Example 1. The monodisperse latex produced contained 26.9% of polystyrene particles with a number-average diameter of 5.8 $\mu$m and a standard deviation of 0.12 $\mu$m. A control polymerization without the Polywet KX-3 resulted in complete coagulation of the latex during polymerization.

EXAMPLE 4

To 55.8 g of the monodisperse latex prepared in Example 3 in a 12-oz glass bottle was added 0.29 g 5% aqueous Aerosol MA solution, 3.15 g 1% aqueous Polywet KX-3 solution, 31.5 g 1% aqueous Polyvinylpyrrolidone K-30 solution, and 135.1 g deionized water. To this latex was added 75.2 g inhibitor-free styrene, 0.02 g divinylbenzene (55% active), 0.086 g 2,2'-azobis-(2-methylbutyronitrile), 0.063 g hydroquinone, and 0.011 g benzoquinone. The particle-swelling and polymerization were carried out as described in Example 1. The monodisperse latex produced contained 24.2% of polystyrene particles with a number-average diameter of 10.6 $\mu$m and a standard deviation of 0.16 $\mu$m. A control polymerization without the Aerosol MA gave a latex of broad particle size distribution.

EXAMPLE 5

To 62.0 g of the monodisperse latex prepared in Example 4 in a 12-oz glass bottle was added 0.29 g 5% aqueous Aerosol MA solution, 3.15 g 1% aqueous Polywet KX-3 solution, 31.5 g 1% aqueous Polyvinylpyrrolidone K-30 solution, and 126.9 g deionized water. To this latex was added 75.2 g inhibitor-free styrene, 0.02 g divinylbenzene (55% active), 0.086 g 2,2'-azobis-(2-methylbutyronitrile), 0.063 g hydroquinone, and 0.011 g benzoquinone. The particle-swelling and polymerization were carried out as described in Example 1. The monodisperse latex produced contained 4.9% of polystyrene particles with a number-average diameter of 18.8 $\mu$m and a standard deviation of 0.30 $\mu$m.

EXAMPLE 6

To 5.4 g of a monodisperse latex which contained 26.6% polystyrene particles with a number-average diameter of 2.5 $\mu$m and a standard deviation of 0.05 $\mu$m, 0.03% Aerosol MA, and 0.085% polyvinylpyrrolidone K-30 (the latter two from the previous seeding step) in a 1 oz glass bottle was added 0.42 g 5% aqueous sodium vinyltoluenesulfonate solution, 1.9 g 1% aqueous polyvinylpyrrolidone K-30 solution, and 11.2 g deionized water. To this latex was added 5.2 g inhibitor-free styrene, 0.02 g 2,2'-azobis-(isobutyronitrile) (Vazo 64; E. I. du Pont de Nemours) initiator, and 0.036 g hydroquinone. The particle-swelling and polymerization were carried out as described in Example 1. The monodisperse latex produced contained 21.1% of polystyrene particles with a number-average diameter of 4 1 $\mu$m and standard deviation of 0.07 $\mu$m. Other polymerizations using Cops I (sodium short-chain vinyl sulfonate-alcolac) or sodium styrenesulfonate instead of sodium vinyltoluenesulfonate gave similar results. A control polymerization without the comonomeric emulsifier resulted in complete coagulation of the latex.

EXAMPLE 7

To 5.4 g of a monodisperse latex which contained 22.4% polystyrene particles with a number-average diameter of 1.5 $\mu$m and a standard deviation of 0 02 $\mu$m and 0.03% Aerosol MA (from the previous seeding step) in a 1-oz glass bottle was added 1.9 g 1% aqueous hydroxyethylcellulose (Cellosize WP-09; Union Carbide) solution and 11.2 g of deionized water. To this latex was added 5.2 g inhibitor-free styrene, 0.020 g 2,2'-azobis-(isobutyronitrile), and 0.036 g hydroquinone. The particle-swelling and polymerization were carried out as described in Example 1. The monodisperse latex produced contained 22.7% of polystyrene particles with a number-average diameter of 2.5 $\mu$m and a standard deviation of 0.05 $\mu$m. Another polymerization which used Polyacrylamide 50 (American Cyanamid) instead of the hydroxyethylcellulose gave the same results. A control polymerization which used polyvinyl alcohol (Vinol 205; Air Products and Chemicals) instead of the hydroxyethylcellulose or polyacrylamide gave a latex with a bimodal particle size distribution, with larger particles of 2–5 $\mu$m diameter and a new crop of smaller particles of 0.2–0.6 $\mu$m diameter.

EXAMPLE 8

To 7.23 g of a monodisperse latex which contained 20.8% polystyrene particles with a number-average diameter of 2.5 $\mu$m and a standard deviation of 0.05 $\mu$m in a 1-oz glass bottle was added 0.13 g 1% aqueous Aerosol MA solution, 0.31 g 1% aqueous Polywet KX-3 solution, 3.1 g 1% aqueous polyvinylpyrrolidone K-30 solution, and 8.3 g deionized water. To this latex was added 6.0 g inhibitor-free styrene, 0.010 g 2,2'-azo-bis-(2-methylbutyronitrile), and 0.0060 g sodium dimethyldithiocarbamate. The particle-swelling and polymerization were carried out as described in Example 1. The monodisperse latex produced contained 27.8% of polystyrene particles with a number-average diameter of 4.2 $\mu$m and a standard deviation of 0.8 $\mu$m. A control polymerization which used N,N-dimethylhydroxylamine hydrochloride instead of the sodium dimethyldithiocarbamate produced massive coagulum and a latex which contained 9.9% polystyrene particles with a number-average diameter of 4.0 μm and a significant crop of off-size larger particles of 5-9 μm diameter.

EXAMPLE 9

To 7.5 g of a monodisperse latex which contained 20.3% polystyrene particles with a number-average diameter of 5.6 μm and a standard deviation of 0.07 μm in a 1-oz glass bottle was added 10.0 g 1% aqueous 98.8:0.2:1.0 vinylpyrrolidone-isodecyl methacrylate-sodium vinylsulfonate terpolymer (molecular weight $4 \times 10^5$) solution and 1.5 g deionized water. To this latex was added 6.0 g inhibitor-free styrene, 0.0065 g 2,2'-azobis-(2-methylbutyronitrile), and 0.0060 g hydroquinone. The particle-swelling and polymerization were carried out as described in Example 1. The monodisperse latex produced contained 29.1% polystyrene particles with a number-average diameter of 9.6 μm and a standard deviation of 0.2 μm. A similar polymerization which used a 99.0:1.0 vinylpyrrolidone-sodium vinylsulfonate copolymer instead of the terpolymer gave a latex which contained 26.6% polystyrene particles of about the same size but with a slightly broader particle size distribution. A control polymerization which used polyvinylpyrrolidone K-90 instead of the terpolymer or copolymer gave a latex which contained 8.5% polystyrene particles of 9-11 μm diamter and a crop of off-size larger particles of 100-500 μm diameter.

EXAMPLE 10

To 128.2 g of a monodisperse latex which contained 23.4% polystyrene particles with a number-average diameter of 2.52 μm and a standard deviation of 0.046 μm in a 12-oz glass bottle was added 3.01 g 1% aqueous Aerosol MA solution, 4.89 g 1% aqueous Polywet KX-3 solution, 40.8 g 1% aqueous polyvinylpyrrolidone K-30 solution, 63.1 g deionized water, 60.0 g inhibitor-free styrene, 0.072 g 2,2'-azobis(2-methylbutyronitrile), and 0.072 g hydroquinone. The bottle was capped and rolled on rollers for 12 hours to allow the styrene to swell the particles. 100 ml of the reaction mixture was loaded into a 100-ml stirred stainless-steel piston-cylinder reactor-dilatometer (NASA Monodisperse Latex Reactor-"MLF"), which was mounted in a NASA Space Shuttle and carried into its orbit. During the flight, the reaction mixture was heated for 11 hours at 70° C. and 1 hour at 90° C. under oscillatory agitation at 13 rpm. The monodisperse latex produced contained 28.3% polystyrene particles with a number-average diameter of 3.44 μm and a standard deviation of 0.064 μm. A ground-based control polymerization which used the same recipe in the same reactor after the flight gave a monodisperse latex which contained 27.0% polystyrene particles with a number-average diameter of 3.72 μm and a standard deviation of 0.057 μm.

EXAMPLE 11

To 76.9 g of a monodisperse latex which contained 23.4% polystyrene particles with a number-average diameter of 2.52 μm and a standard deviation of 0.046 μm (the same seed latex used in Example 10) in a 12-oz glass bottle was added 1.50 g 1% aqueous Aerosol MA solution, 3.69 g 1% aqueous polyvinylpyrrolidone K-30 solution, 109.0 g deionized water, 72.0 g inhibitor-free styrene, 0.12 g 2,2'-azobis-(2-methylbutyronitrile) and 0.072 g hydroquinone. The bottle was capped and rolled on rollers to allow the styrene to swell the latex particles. 100 ml of the reaction mixture was loaded into a MLR reactor, which was mounted in a NASA Space Shuttle and carried into its orbit. During the flight, the reaction mixture was heated for 11 hours at 70° C. and 1 hour at 90° C. under oscillatory agitation at 13 rpm. The monodisperse latex produced contained 24.6% polystyrene particles with a number-average diameter of 4.08 μm and a standard deviation of 0.069 μm. A ground-based control polymerization using the same recipe in the same reactor after the flight gave a monodisperse latex which contained 29.7% polystyrene particles with a number-average diameter of 3.93 μm and a standard deviation of 0.077 μm.

EXAMPLE 12

To 35.0 g of a monodisperse polystyrene latex which contained 23.5% polystyrene particles with a number-average diameter of 2.52 μm and a standard deviation of 0.046 μm (the same seed latex used in Examples 10 and 11) in a 12-oz glass bottle was added 0.68 g 1% aqueous Aerosol MA solution, 3.48 g 1% aqueous Polywet KX-3 solution, 34.3 g 1% aqueous polyvinylpyrrolidone K-30 solution, 144.7 g deionized water, 81.8 g inhibitor-free styrene, 0.24 g 2,2'-azobis-(2-methylbutyronitrile), and 0.072 g hydroquinone. The bottle was capped and rolled on rollers for 12 hours to allow time for the styrene to swell the particles. 100 ml of the reaction mixture was loaded into a MLR reactor, which was mounted in a NASA Space Shuttle and carried into its orbit. During the flight, the reaction mixture was heated for 11 hours at 70° C. and 1 hour at 90° C. under oscillatory agitation at 13 rpm. The monodisperse latex produced contained 22.8% polystyrene particles with a number-average diameter of 4.98 μm and a standard deviation of 0.082 μm. A ground-based control polymerization which used the same recipe in the same reactor after the flight gave a monodisperse latex which contained 25.4% polystyrene particles with a number-average diameter of 4.74 μm and a standard deviation of 0.17 μm.

EXAMPLE 13

To 98.5 g monodisperse latex which contained 20.3% polystyrene particles with a number-average diameter of 5.63 μm and a standard deviation of 0.073 μm in a 12-oz glass bottle was added 2.0 g 1% aqueous Aerosol MA solution, 3.30 g 1% aqueous Polywet KX-3 solution, 27.2 g 1% aqueous polyvinylpyrrolidone K-30 solution, 28.7 g deionized water, 40.0 g inhibitor-free styrene, 0.011 g divinylbenzene (55% active), 0.030 g 2,2'-azobis-(2-methylbutyronitrile), 0.048 g hydroquinone, and 0.0012 g benzoquinone. The bottle was capped and rolled on rollers for 12 hours to allow time for the styrene to swell the particles. 100 ml of the reaction mixture was loaded into a MLR reactor, which was mounted in a NASA Space Shuttle and carried into its orbit. During the flight, the reaction mixture was heated for 17 hours at 70° C. and 1 hour at 90° C. under oscillatory agitation at 13 rpm. The monodisperse latex produced contained 26.9% polystyrene particles with a number-average diameter of 7.95 μm and a standard deviation of 0.12 μm. A ground-based control polymerization which used the same recipe in the same reactor after the flight gave a monodisperse latex which contained 27.7% polystyrene particles with a number-average diameter of 7.86 μm and a standard deviation of 0.14 μm.

EXAMPLE 14

To 42.2 g of a monodisperse polystyrene latex which contained 20.3% polystyrene particles with a number-average diameter of 5.63 μm and a standard deviation of 0.073 μm (the same seed latex used in Example 13) in a 12-oz glass bottle was added 0.756 g of 1% aqueous Aerosol MA solution, 2.30 g 1% aqueous Polywet KX-3 solution, 23.2 g 1% aqueous polyvinylpyrrolidone K-30 solution, 79.8 g deionized water, 51.4 g inhibitor-free styrene, 0.014 g divinylbenzene (55% active), 0.066 g 2,2'-azobis-(2-methylbutyronitrile), 0.048 g hydroquinone, and 0.0012 g benzoquinone. The bottle was capped and rolled on rollers for 12 hours to allow the styrene to swell the particles. 100 ml of the reaction mixture was loaded into a MLR reactor, which was mounted in a NASA Space Shuttle and carried into its orbit. During the flight, the reaction mixture was heated for 17 hours at 70° C. and 1 hour at 90° C. under oscillatory agitation at 13 rpm. The monodisperse latex produced contained 22% polystyrene particles with a number-average diameter of 9.96 μm and a standard deviation of 0.12 μm. This latex was later accepted by the National Bureau of Standards as a Standard Reference Material. A ground based control polymerization which used the same recipe in the same reactor after the flight gave a monodisperse latex which contained 22.9% polystyrene particles with a number-average diameter of 10.04 μm and a standard deviation of 0.28 μm.

EXAMPLE 15

To 85.4 g of the monodisperse polystyrene latex prepared in Example 13 in a 12-oz glass bottle was added 0.43 g 1% aqueous Aerosol MA solution, 1.77 g 1% aqueous Polywet KX-3 solution, 18.9 g 1% aqueous polyvinylpyrrolidone K-30 solution, 95.4 g deionized water, 51.4 g inhibitor-free styrene, 0.014 g divinylbenzene (55% active), 0.066 g 2,2'-azobis-(2-methylbutyronitrile), 0.048 g hydroquinone, and 0.0060 g benzoquinone. The bottle was capped and rolled on rollers for 12 hours to allow the styrene to swell the particles. 100 ml of the reaction mixture was loaded into a MLR reactor, which was mounted in a NASA Space Shuttle and carried into its orbit. During the flight, the reaction mixture was heated for 17 hours at 70° C. and 1 hour at 90° C. under oscillatory agitation at 13 rpm. The monodisperse latex produced contained 17.3% polystyrene particles with a number-average diameter of 13.12 μm and a standard deviation of 0.15 μm. A ground-based control polymerization which used the same recipe in the same reactor after the flight gave a latex which contained 21.8% polystyrene particles with a number-average diameter of 13.89 μm and a standard deviation of 0.37 μm.

EXAMPLE 16

To 31.6 g of a monodisperse polystyrene latex which contained 38.0% polystyrene particles with a number-average diameter of 10.30 μm and a standard deviation of 0.14 μm in a 12-oz glass bottle was added 1.0 g 1% aqueous Aerosol MA solution, 2.50 g 1% aqueous Polywet KX-3 solution, 24.8 g 1% aqueous polyvinylpyrrolidone K-30 solution, 91.9 g deionized water, 48.0 g inhibitor-free styrene, 0.014 g divinylbenzene (55% active), 0.041 g 2,2'-azobis-(2-methylbutyronitrile), 0.0489 g hydroquinone, and 0.0060 g benzoquinone. The bottle was capped and rolled on rollers for 12 hours to allow time for the styrene to swell the particles. 100 ml of the reaction mixture was loaded into a MLR reactor, which was mounted in a NASA Space Shuttle and carried into its orbit. During the flight, the reaction mixture was heated for 17 hours at 70° C. and 1 hour at 90° C. under oscillatory agitation at 13 rpm. The monodisperse latex produced contained 17.1% polystyrene particles with a number-average diameter of 16.64 μm and a standard deviation of 0.20 μm. A ground-based control polymerization which used the same recipe in the same reactor after the flight gave a latex which contained 24.1% polystyrene particles with a number-average diameter of 17.17 μm and a standard deviation of 0.39 μm.

EXAMPLE 17

To 22.5 g of a monodisperse polystyrene latex which contained 38.0% polystyrene particles with a number-average diameter of 10.30 μm and standard deviation of 0.14 μm (the same seed latex used in Example 16) in a 12-oz glass bottle was added 0.75 g 1% aqueous Aerosol MA solution, 2.30 g 1% aqueous Polywet KX-3 solution, 23.2 g 1% aqueous polyvinylpyrrolidone K-30 solution, 99.6 g deionized water, 51.4 g inhibitor-free styrene, 0.014 g divinylbenzene (55% active), 0.066 g 2,2'-azobis-(2-methylbutyronitrile), 0.048 g hydroquinone, and 0.006 g benzoquinone. The bottle was capped and rolled on rollers for 12 hours to allow time for the styrene to swell the particles. 100 ml of the reaction mixture was loaded into a MLR reactor, which was mounted in a NASA Space Shuttle and carried into its orbit. During the flight, the reaction mixture was heated for 17 hours at 70° C. and 1 hour at 90° C. under oscillatory agitation at 6 rpm. The monodisperse latex produced contained 20.5% polystyrene particles with a number-average diameter of 17.81 μm and a standard deviation of 0.21 μm. A ground-based control polymerization which used the same recipe in the same reactor after the flight gave a monodisperse latex which contained 12.9% polystyrene particles with a number-average diameter of 17.68 μm and a standard deviation of 0.95 μm.

EXAMPLE 18

To 22.5 g of a monodisperse polystyrene latex which contained 38.0% polystyrene particles with a number-average diameter of 10.30 μm and a standard deviation of 0.14 μm (the same seed latex used in Examples 16 and 17) in a 12-oz glass bottle was added 0.75 g 1% aqueous Aerosol MA solution, 2.30 g 1% aqueous Polywet KX-3 solution, 23.2 g 1% aqueous polyvinylpyrrolidone K-30 solution, 99.6 g deionized water, 51.4 g inhibitor-free styrene, 0.014 g divinylbenzene (55% active), 0.066 g 2,2'-azobis-(2-methylbutyronitrile), 0.048 g hydroquinone, and 0.0060 g benzoquinone. The bottle was capped and rolled on rollers for 12 hours to allow the styrene to swell the particles. 100 ml of the reaction mixture was loaded into a MLR reactor, which was mounted in a NASA Space Shuttle and carried into its orbit. During the flight, the reaction mixture was heated for 17 hours at 70° C. and 1 hour at 90° C. under oscillatory agitation at 3 rpm. The monodisperse latex produced contained 20.5% polystyrene particles with a number-average diameter of 18.18 μm and a standard deviation of 0.02 μm. A ground-based control polymerization which used the same recipe in the same reactor after the flight produced massive coagulum and a latex which contained 3.4% polystyrene particles with a number-average diameter of 16.97 μm and a standard deviation of 0.78 μm.

EXAMPLE 19

To 39.4 g of a monodisperse polystyrene latex which contained 38.0% polystyrene particles with a number-average diameter of 10.30 μm and a standard deviation of 0.14 μm (the same seed latex used in Examples 16–18) in a 12-oz glass bottle was added 1.30 g 1% aqueous Aerosol MA solution, 4.10 g 1% aqueous Polywet KX-3 solution, 40.6 g 1% aqueous polyvinylpyrrolidone K-30 solution, 174.3 g deionized water, 90.0 g inhibitor-free styrene, 0.024 g divinylbenzene (55% active), 0.12 g 2,2'-azobis-(2-methylbutyronitrile), 0.084 g hydroquinone, and 0.011 g benzoquinone. The bottle was capped and rolled on rollers for 12 hours to allow the styrene to swell the particles. 100 ml of the reaction mixture was loaded into a MLR reactor, which was mounted in a NASA Space Shuttle and carried into its orbit. During the flight, the reaction mixture was heated for 17 hours at 70° C. and 1 hour at 90° C. under oscillatory agitation at 6 rpm. The monodisperse latex produced contained 22.0% polystyrene particles with a number-average diameter of 19.44 μm and a standard deviation of 0.24 μm.

EXAMPLE 20

To 85.4 g of the monodisperse polystyrene latex prepared in Example 17 in a 12-oz glass bottle was added 0.75 g 1% aqueous Aerosol MA solution, 3.10 g 1% aqueous Polywet KX-3 solution, 33.0 g 1% aqueous polyvinylpyrrolidone K-30 solution, 139.8 g deionized water, 87.5 g inhibitor-free styrene, 0.024 g divinylbenzene (55% active), 0.12 g 2,2'-azobis-(2-methylbutyronitrile), 0.084 g hydroquinone, and 0.011 g benzoquinone. The bottle was capped and rolled on rollers for 12 hours to allow the styrene to swell the particles. 100 ml of the reaction mixture was loaded into a MLR reactor, which was mounted in a NASA Space Shuttle and carried into its orbit. During the flight, the reaction mixture was heated for 17 hours at 70° C. and 1 hour at 90° C. under oscillatory agitation at 3 rpm. The monodisperse latex produced contained 19.4% polystyrene particles with a number-average diameter of 30.92 μm and a standard deviation of 0.44 μm. A duplicate polymerization which used the same recipe in the same flight carried out in another MLR reactor but under oscillatory agitation of 6 rpm gave a monodisperse latex which contained 17.7% polystyrene particles with a number-average diameter of 30.42 μm and a standard deviation of 0.41 μm. Both latexes were submitted to the National Bureau of Standards for evaluation as Standard Reference Materials.

We claim:

1. A method of serially preparing a monodisperse latex comprising the steps of making a first monodisperse latex having an average particle size of at least 2–30 microns, by polymerizing a mixture of:
    (A) about 2–30 parts by weight of a monodisperse seed latex polymer of particle size on the order of 2 microns or less;
    (B) about 10–50 parts by weight of a polymerizable, non-crosslinking monomer,
    (C) 0 to about 0.1 parts by weight of a crosslinking monomer,
    (D) about 0.01–0.2 parts by weight of an initiator,
    (E) about 0.001 to 0.1 parts by weight of at least one inhibitor.
    (F) an emulsifier component comprising:
        (i) about 0.05–20 parts by weight of a first water-soluble polymeric emulsifier of molecular weight of about $10^4$–$10^7$,
        (ii) 0 to about 0.05 parts by weight of a second water-soluble comonomeric or polymeric emulsifier of molecular weight of about $0.3 \times 10^3$–$5 \times 10^3$, and
        (iii) 0 to about 0.01 parts by weight of a non-polymeric anionic emulsifier, and
    (G) the balance being water, to make 100 parts by weight of total mixture,
and
    (1) admixing said first monidisperse latex in an amount of about 2–30 parts by weight thereof on a polymer solids basis, as a seed latex with ingredients (B) through (G) and in the amounts thereof to form a second mixture;
    (2) polymerizing said second mixture to produce a second latex product of larger particle size than said first monodisperse latex; and
    (3) repeating said steps (1) and (2) utilizing as the seed latex in step (1) of each successive polymerization, the larger particle size latex product produced by the immediately preceding polymerization of step (2), until a latex of a desired particle size is obtained.

2. The method of claim 1 wherein one or more of the polymerization of Steps (1) or (2) are conducted in a microgravity environment.

* * * * *